(12) United States Patent
Teresi et al.

(10) Patent No.: US 6,505,503 B1
(45) Date of Patent: Jan. 14, 2003

(54) STATIONARY DRAG RACING SIMULATION SYSTEM

(75) Inventors: Joseph Teresi, Fort Lauderdale, FL (US); Stewart P. Prince, Northridge, CA (US)

(73) Assignee: Teresi Publications, Inc., Wilmington, DE (US)

( * ) Notice: Subject to any disclaimer, the term of this patent is extended or adjusted under 35 U.S.C. 154(b) by 0 days.

(21) Appl. No.: 09/579,078

(22) Filed: May 25, 2000

Related U.S. Application Data

(63) Continuation-in-part of application No. 09/217,086, filed on Dec. 21, 1998, now Pat. No. 6,123,547.

(51) Int. Cl.⁷ .................................................. G09B 9/04
(52) U.S. Cl. ........................ 73/117; 73/117.1; 73/126; 73/865.6; 340/466
(58) Field of Search ........................ 73/112, 116, 117, 73/117.1, 117.2, 117.3, 121, 123, 126, 862, 862.08, 862.09, 862.191, 147, 865.6; 340/425.5, 438, 439, 441, 463, 466, 467, 468

(56) References Cited

U.S. PATENT DOCUMENTS

| | | |
|---|---|---|
| 554,754 A | 2/1896 | Webber |
| 1,354,021 A | 9/1920 | Clegg |
| 1,511,496 A | 10/1924 | Belden |
| 2,287,084 A | 6/1942 | Bennett |
| 2,504,007 A | 4/1950 | Declercq |
| 3,526,042 A | 9/1970 | Nelson |
| 3,606,328 A | 9/1971 | Delphia, Jr. |
| 3,686,776 A | 8/1972 | Dahl |
| 3,827,292 A | 8/1974 | Zelson |
| 3,940,978 A | 3/1976 | Akkerman et al. |
| 4,082,265 A | 4/1978 | Berkes |
| 4,134,230 A | 1/1979 | Roy |
| 4,214,381 A | 7/1980 | Clark et al. |

(List continued on next page.)

FOREIGN PATENT DOCUMENTS

| | | |
|---|---|---|
| DE | 32 43 837 A1 | 5/1984 |
| FR | 918.470 | 2/1947 |

OTHER PUBLICATIONS

Gunther Schmidt, "Grundlagen der Regelunstechnik", 1991, Springer Verlag, XP–002197937, pp. 246–260; Figure 5.1.

Elmar Schrufer, "Elektrische Messtechnik", 1988 Hanser Verlag, XP–002197938,Pp. 405–419; Figure 6.35, pp. 268–276; Figure 3.53.

www.jakebrake.com/products/driveline/theory.htm "Driveline Brake Theory & Operation" 1996.

Primary Examiner—Eric S. McCall
(74) Attorney, Agent, or Firm—Fulwider Patton Lee & Utecht, LLP

(57) ABSTRACT

The vehicle drag racing simulation system includes a drag racing simulation area typically for a plurality of vehicles, such as a flatbed of a truck. A restraining assembly is provided for rigidly securing the vehicles to the platform in a generally upright position. A rotatable drive wheel support member is also provided in each drag racing simulation area, having an outer face for rotatably engaging the drive wheels of the vehicles. The rotatable drive wheel support member is operatively engaged with an eddy current braking device allowing the application of a braking torque for simulating drag racing inertial, aerodynamic, and frictional forces. A brake torque sensor and control unit are provided for feedback control of the application of braking torque applied by the eddy current braking device based upon desired brake torque and actual brake torque applied. The elapsed time, reaction time, horsepower, revolutions per minute, simulated speed, and simulated forward progress of the vehicles can be displayed.

15 Claims, 8 Drawing Sheets

U.S. PATENT DOCUMENTS

| | | |
|---|---|---|
| 4,385,518 A | 5/1983 | Rickett |
| 4,415,152 A | 11/1983 | Smith |
| 4,846,686 A | 7/1989 | Adams |
| 4,978,300 A | 12/1990 | Letovsky et al. |
| 4,991,514 A | 2/1991 | Powell et al. |
| 5,010,763 A | 4/1991 | Schneider |
| 5,015,189 A | 5/1991 | Wenzinger, Jr. |
| 5,076,792 A | 12/1991 | Niermann |
| 5,089,960 A | 2/1992 | Sweeney, Jr. |
| 5,209,662 A | 5/1993 | Fujita et al. |
| 5,240,417 A | 8/1993 | Smithson et al. |
| 5,299,810 A | 4/1994 | Pierce et al. |
| 5,361,705 A * | 11/1994 | Powell ........................ 104/60 |
| 5,364,271 A | 11/1994 | Aknin et al. |
| 5,415,550 A | 5/1995 | Aoki et al. |
| 5,445,013 A | 8/1995 | Clayton, Jr. |
| 5,490,584 A | 2/1996 | Estaque et al. |
| 5,547,382 A | 8/1996 | Yamasaki et al. |
| 5,575,359 A | 11/1996 | Melde-Tuczai |
| 5,660,547 A | 8/1997 | Copperman |
| 5,711,670 A | 1/1998 | Barr |
| 5,865,624 A | 2/1999 | Hayashigawa |
| 5,892,294 A * | 4/1999 | Reid ........................ 307/10.1 |
| 6,123,547 A * | 9/2000 | Teresi |
| 2002/0018982 A1 * | 2/2002 | Conroy ........................ 434/62 |

* cited by examiner

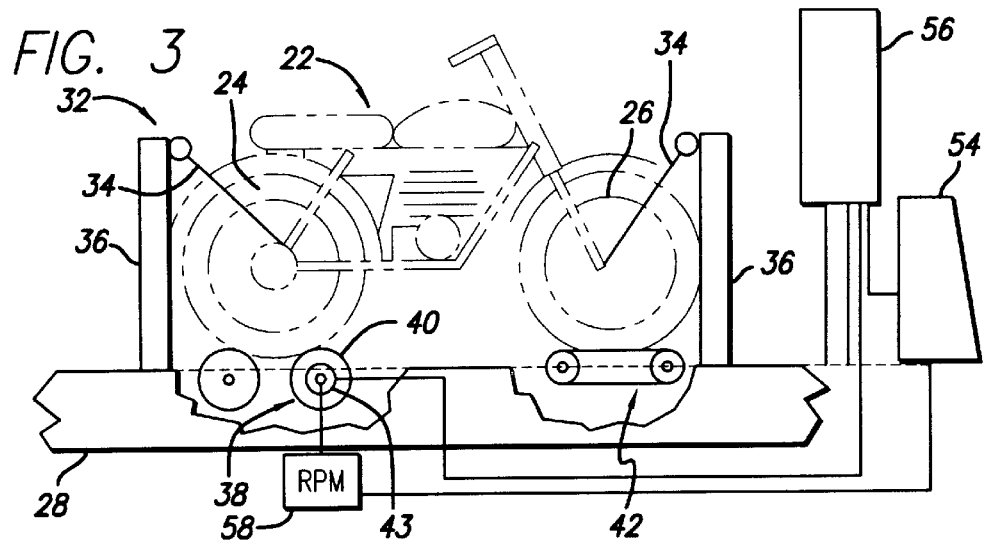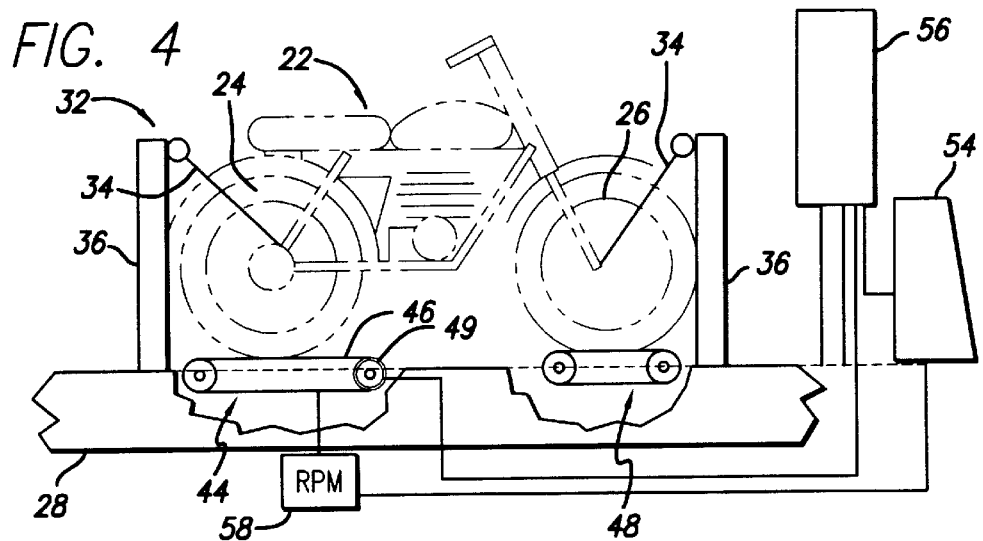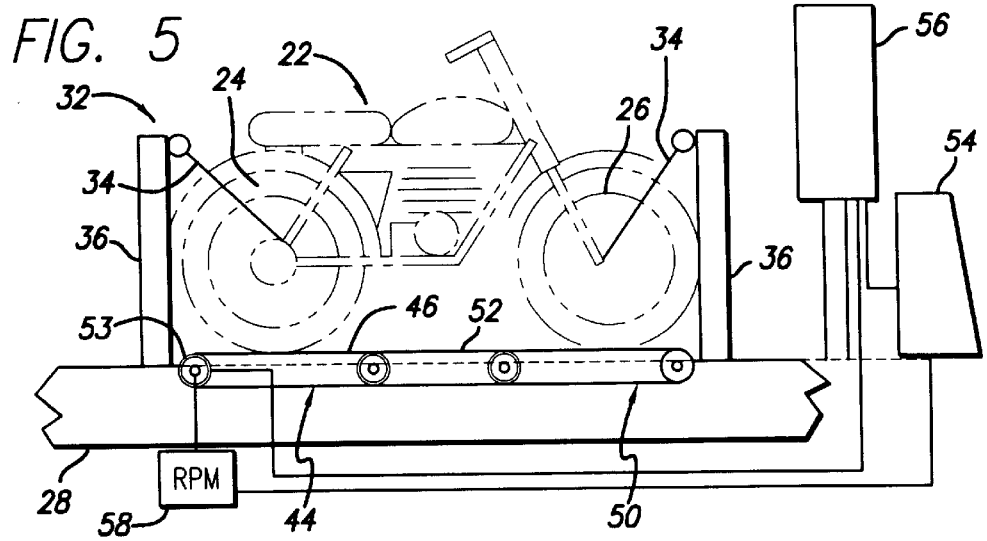

FIG. 11

| File | Edit | View | Window | Help | | | | | |
|---|---|---|---|---|---|---|---|---|---|
| Address frm | | | dyno frm | | New Race | Update | Stage | Start Race | Print Results | Reset | test | CALIB |

Address Table

| | |
|---|---|
| RacerID: | 2 |
| Last Name: | Blair |
| First Name: | Mil |
| Address: | 626 north sunset canyon |
| City: | Burbank |
| State: | CA |
| Zip Code: | 91501 |
| Country: | USA |
| Email Address: | harleymil@aol.com |
| Phone: | (818) 846-3924 |
| Motorcycle Type: | Harley |
| Model: | FXR |
| Displacement: | 1380 |
| Bike/Diver Weight: | 790 |
| Frontal Area: | 8 |
| Drag Coefficient: | 0.5 |
| Bike Comments: | |

Add  Delete    Refresh  Update    Close

Record: 3

FIG. 12

| racenumber | |
|---|---|
| racenumber_id: | 297 |
| Date: | 1/3/00 |
| racerft_id: | 1 |
| ET_left: | 14.845 |
| RT_left: | 515.754 |
| VMAX_left: | 83.103 |
| DNF_left: | yes |
| Winner_left: | no |
| racerright_id: | 4 |
| ET_right: | 13.931 |
| RT_right: | 0.553 |
| VMAX_right: | 96.617 |
| DNF_right: | no |
| Winner_right: | yes |

Left Lane: Prince — Honda, Interceptor

Right Lane: garcia — tacobueno, scooter

[Add] [Delete] [Print] [Update] [Close]

Record: 297

STATIONARY DRAG RACING SIMULATION SYSTEM

RELATED APPLICATIONS

This is a continuation in part of Ser. No. 09/217,086, filed Dec. 21, 1998 now U.S. Pat. No. 6,123,547.

BACKGROUND OF THE INVENTION

1. Field of the Invention

This invention relates generally to vehicle drag racing simulation systems, and more particularly concerns drag racing simulation systems for simultaneous competition of two or more vehicles, such as for racing of cars, trucks, bicycles and the like, and for measuring the horsepower and simulated speed in a stationary competitive situation, such as for simulating performance in a quarter-mile race.

2. Description of Related Art

Drag racing of vehicles such as automobiles and motorcycles has long been a popular sport, and has developed from impromptu street racing to a high performance, commercial event often staged in a special stadium with a track for the actual competition, and burnout areas for preparation of tires prior to racing. However, as the horsepower and speeds of such vehicles have increased, so have the risks grown to the individual competitors. Advances in safety strategies and equipment have partially limited these risks, but are not readily available to members of the public who may desire to test their amateur skills and their own vehicles in head to head competition. A need has therefore arisen for a way of safely simulating drag racing of vehicles.

In a typical sanctioned drag race, a staging light on a race "tree" signals the competitors to enter a staging area where a set of light traps determine when the front wheels of the vehicles are in a staged position. When both racers are staged, the lights on the race tree begin the race sequence: three amber lights turn on, in succession, 0.4 seconds apart, and finally, a fourth green light is turned on, signalling the beginning of the race. The elapsed time between the illumination of the green light and the moment the racer's front wheel crosses a second light trap is known as "reaction time" (RT), and the time from when the light trap is activated to the end of the race is known as "elapsed time" (ET). The reaction time plus elapsed time gives the "total time," and the racer with the lowest total time wins the race, assuming that the winner did not "red light," or start before the signal for the beginning of the race. At the end of the race, the final velocity (VELOCITY) of the racers is measured, and the race results displayed usually include: RT, ET, VELOCITY, and WINNER.

In one approach to simulation of drag racing of vehicles, two automobiles simulate racing conditions using dynamometer equipment instead of an open roadway. Two adjacent stalls for the automobiles are provided, with dynamometric traction means in each stall for engaging the rear wheels of the automobiles. A distance monitor with an indicator provide for indication of progress of the simulated race, as well as the results of the race. No particular skill is called for in steering the automobiles, since they are securely engaged in position in their stalls so that their simulated progress can be monitored by the dynamometer equipment.

A bicycle racing simulator is also known that provides for the simultaneous riding of one or more cycles to simulate competitions within a limited area. The driving wheel of each cycle drives a fluid pump, allowing close monitoring of the efforts of each cyclist. Indications given by the level of the liquid in a column filled by the fluid pump provide an indication of simulated distance traveled by the vehicle. However, very little freedom of movement of the cycles are tolerated, so that the cycles must remain in a relatively fixed position, and in order to prevent vacillation, the cycles may be mounted on pinions.

Another similar bicycle training and exercise device is known in which a conventional bicycle is mounted and restrained for exercise and/or riding training. The rear wheel is engaged between two rear rollers, preventing forward and back movement of the bicycle in a longitudinal direction. A moving roller supported beltway for the front wheel simulates a roadway surface and is powered by the rear traction wheel of the bicycle or by an independent drive device. The device includes a horizontal moving beltway consisting of an endless moving belt supported by rollers. The rollers prevent the rider from steering the bicycle off of the moving belt, and prevent the bicycle wheels from skidding off the belt. Restraint chains are attached to the frame of the bicycle, enabling limited steering and tilting of the bicycle for training purposes, while maintaining the orientation of the bicycle within safe limits to prevent injury to the rider.

Another known road simulation device is used for testing and demonstration of the operation of a driverless, stationary motorcycle. After the motorcycle is rolled onto the entrance ramp and positioned in an upright manner such that the front tire rests in a longitudinal motorcycle support channel that does not permit rotation of the front tire, the rear tire is rotatably supported upon two rollers.

It is thus apparent that what has been needed and heretofore unavailable in the prior art is a stationary drag racing simulation system for accurately simulating race results of vehicles based upon such factors as the racing skills of the operators of the vehicles, the weight and other performance characteristics of the vehicles, that offers a challenging and realistic ride, and is capable of handling one or more contestants. There thus remains a need for a system and method for simulation of drag racing for simultaneous competition of two or more vehicles, such as motorcycles, that accounts for such factors as inertia of a vehicle and the vehicle operator, aerodynamic forces on the vehicle and the vehicle operator, and frictional forces that can affect the results of vehicle racing. It would also be desirable to provide for monitoring the vehicle horsepower, simulated speed, elapsed time, reaction time, and progress of the contestants during competition. The present invention meets these and other needs.

SUMMARY OF THE INVENTION

Briefly, and in general terms, the present invention provides for a realistic, vehicle drag racing simulation system for simultaneous competition of two or more vehicles, such as motorcycles, that monitors elapsed time, reaction time and operation of the vehicles, so that skill is also a factor involved in racing the vehicles even though they are stationary. A The drag racing simulation system of the invention allows a pair of motorcycle enthusiasts to drag race each other on a stationary assembly. Actual drag racing usually takes place at a drag strip, where the competitors race each other at high speeds and under conditions raising a variety of safety concerns. The drag racing simulation system of the invention fully emulates an actual race in all aspects, except that the motorcycles remain stationary, making the event much safer, while accuracy is maintained by the use of a control system which allows for the realistic simulation and monitoring of the race event.

The present invention accordingly provides for a drag racing simulation system for at least one vehicle, such as a motorcycle, having a drive wheel, for simulating drag racing while the vehicle remains generally stationary within a racing simulation area. A racing platform having a drag racing simulation area is provided, and in a presently preferred embodiment, the racing platform includes a plurality of drag racing simulation areas, for a plurality of vehicles, and can, for example, comprise a flatbed of a truck, so that the drag racing simulation system can itself be mobile. A restraining assembly is provided for rigidly securing the vehicles to the platform in a generally upright position. In a currently preferred embodiment, the restraining assembly comprises a plurality of posts disposed around the drag racing simulation area, and a plurality of straps for firmly securing the vehicles to the posts.

A rotatable drive wheel support member is also provided in each drag racing simulation area, having an outer face for rotatably engaging the drive wheels of the vehicles. In a presently preferred embodiment, the rotatable drive wheel support member comprises a rotatable drum operatively engaged with an eddy current braking device allowing the application of a braking torque simulating drag racing while the vehicle remains generally stationary within a racing simulation area and allowing the monitoring of elapsed time, reaction time, and operation of the vehicles. Typically, the vehicle, such as a motorcycle, has a front wheel and a rear wheel, and the rear wheel is the drive wheel. In a presently preferred aspect of the invention, the rear wheel is restrained in rotating engagement with the rotatable drive wheel support member, while the front wheel is secured to the racing platform.

A monitor is also provided for monitoring the progress of the simulated drag racing, and a control unit is provided for controlling the monitor, and for controlling the application of braking torque applied by the eddy current braking device. One or more sensors are connected to the rotatable drive wheel support member for measuring parameters such as the reaction time, the rotational velocity of the drive wheel and the acceleration of the drive wheel, and the monitor can include means for displaying information about the drag racing simulation, such as one or more video monitors for displaying elapsed time, reaction time, horsepower, revolutions per minute, simulated speed, and simulated forward progress of the vehicles. One presently preferred embodiment provides for a series of lights positioned in front of the vehicles for sequentially displaying the simulated forward progress of the vehicles.

These and other aspects and advantages of the invention will become apparent from the following detailed description and the accompanying drawings, which illustrate by way of example the features of the invention.

BRIEF DESCRIPTION OF THE DRAWINGS

FIG. 3 is a cutaway view of a portion of the drag racing platform of the drag racing simulation system of FIG. 1 showing a first preferred embodiment of a rotatable drive wheel support member;

FIG. 4 is a cutaway view similar to that of FIG. 3 of a portion of the drag racing platform of the drag racing simulation system of the invention showing a second preferred embodiment of a rotatable drive wheel support member including a drive wheel treadmill for the drag racing simulation system of the invention;

FIG. 5 is a cutaway view similar to that of FIG. 3 of a portion of the drag racing platform of the drag racing simulation system of the invention showing a third preferred embodiment of a rotatable drive wheel support member including a drive wheel treadmill linked to a front wheel treadmill for the drag racing simulation system of the invention;

FIG. 11 is an illustration of a display screen for an address form for the computer control system for the drag racing simulation system of FIG. 6; and FIG. 12 is an illustration of a display screen for a "dyno" form for the computer control system for operating the drag racing simulation system of FIG. 6.

DETAILED DESCRIPTION OF THE PREFERRED EMBODIMENTS

While systems for simulating racing of vehicles have improved the safety conditions above those for street or track drag racing of vehicles such as automobiles and motorcycles, such approaches generally have not provided a stationary drag racing simulation system that offers a challenging and realistic ride, accurately simulates race results of vehicles based upon such factors as the racing skills of the operators of the vehicles, the weight and other performance characteristics of the vehicles, and is capable of handling one or more contestants.

Figure 1:
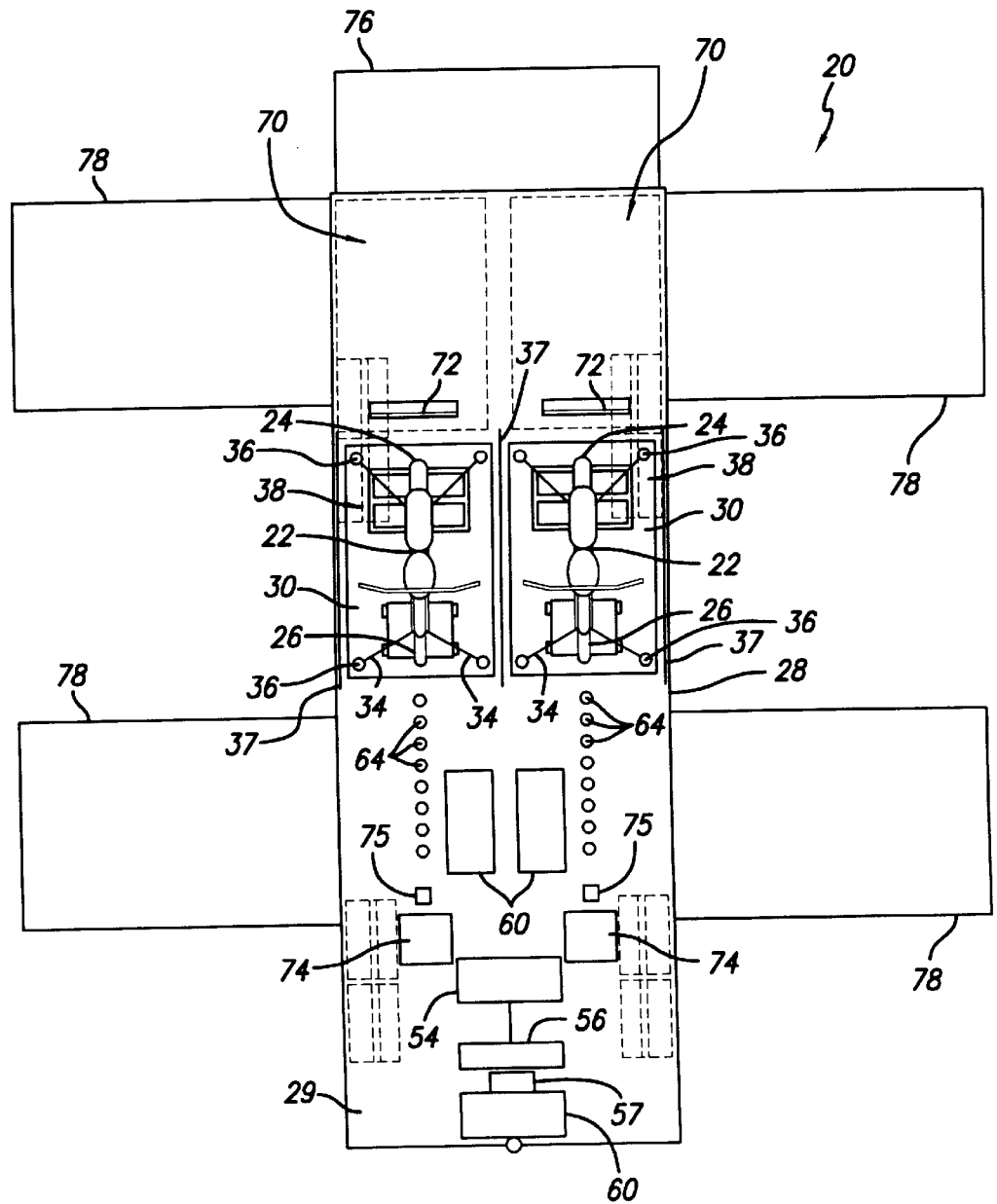
FIG. 1 is a schematic diagram showing a general overview of a first embodiment of the drag racing simulation system of the invention.
Figure 2:
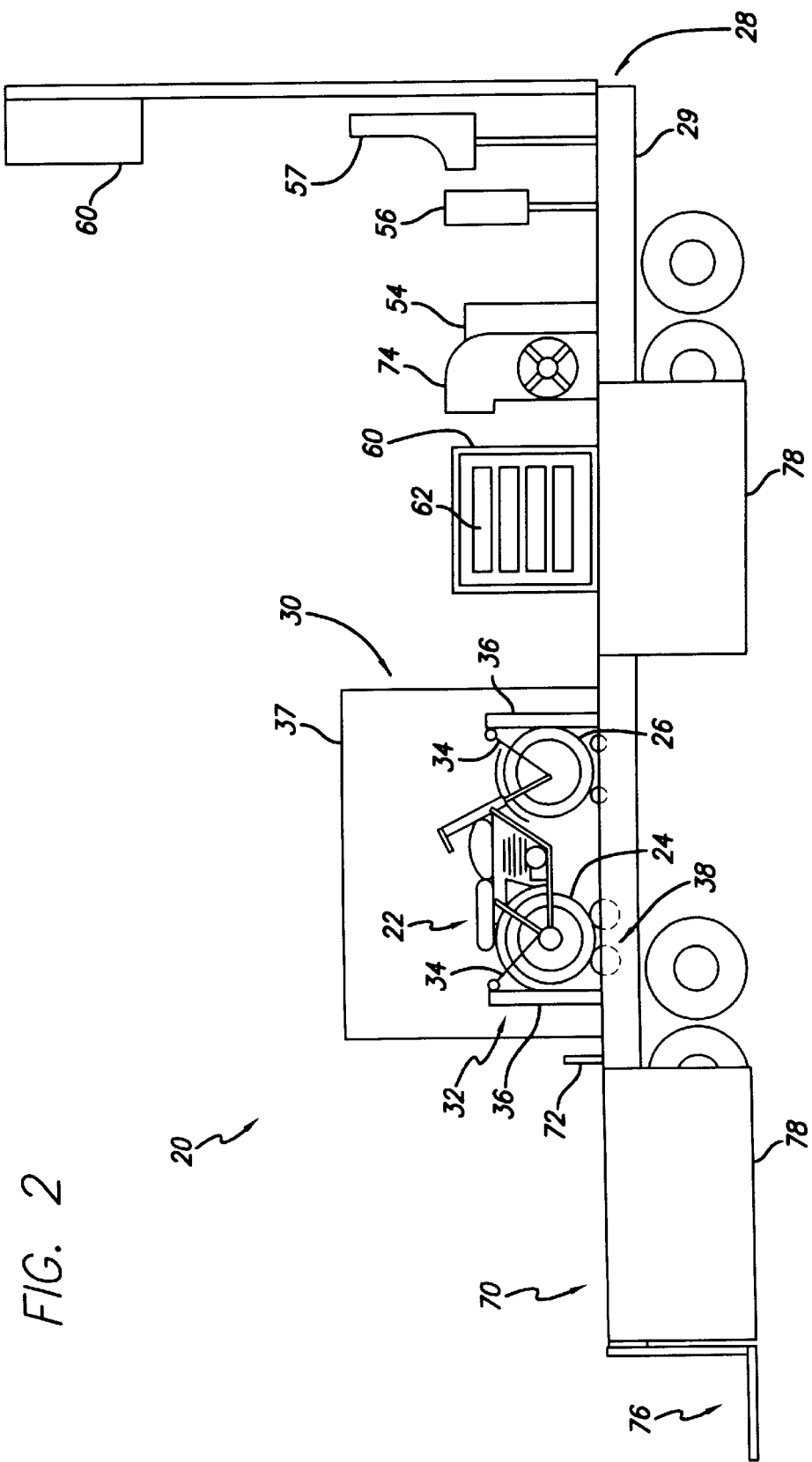
FIG. 2 is a side elevation view of the drag racing simulation system of FIG. 1.

As is illustrated in the drawings, in a first preferred embodiment, the invention is accordingly embodied in a drag racing simulation system 20, shown generally in FIGS. 1 and 2, for a vehicle such as a motorcycle 22, having a drive wheel 24 and an opposing wheel balancing the vehicle, such as a front wheel 26 in rear wheel drive vehicles, for simulating drag racing while the motorcycle remains stationary, although the drag racing simulation system is equally applicable for use with other motorized vehicles such as cars and trucks, as well as non-motorized vehicles such as bicycles and the like having a drive wheel and an opposing wheel balancing the vehicle, such as a front wheel, although the system of the invention would be equally applicable to front wheel drive vehicles. The drag racing simulation system preferably includes a racing platform 28 upon which the vehicles can engage in simulated competition drag racing, and which is preferably viewable by spectators. The racing platform is also preferably portable, so that it could for example, be moved into a stadium, or so that bleachers could be readily brought nearby; and in one presently preferred aspect, the racing platform comprises a flatbed 29 of a truck. The racing platform could also be placed on a trailer, or made similar to a mobile home, so that the racing platform could be towed to a performance location and stationed appropriately for competition and viewing.

The racing platform preferably has a plurality of drag racing simulation areas 30 for accommodating one or more competing vehicles, with each drag racing simulation area having a restraining assembly 32 best seen in FIGS. 3, 4 and 5 for securing the vehicle to the platform in a generally upright position while allowing substantial freedom of movement of the vehicle within the drag racing simulation area. In one presently preferred aspect, illustrated in FIGS. 1 and 2, the restraining assembly includes a plurality of elastic cords 34, such as bungee cords, for example, secured to posts 36 mounted on the platform around the drag racing simulation area, so that the vehicles are allowed limited movement within safe limits to prevent injury to the rider, such as to prevent the vehicles from being driven off the platform or falling over, while allowing to allow limited yaw, pitch and roll movement of the vehicles, as well as vertical, and horizontal forward and backward and side-to-side movement to offer a more challenging and realistic drag racing competition. Alternatively, the vehicles could be restrained by coiled springs, a straps attached to springs, or the like. In a presently preferred aspect, four or more elastic bungee cords connected to four posts in each drag racing simulation area are used to secure each motorcycle to the platform. Plexiglass panels 37 can additionally be installed on the drag racing platform between the drag racing simulation areas to further protect the contestants from injury while permitting spectators to view the contestants and permitting the contestants to view each other, and outside plexiglass panels can also be installed on drag racing platform to further protect the contestants from falling off of the platform, and to protect spectators.

Each drag racing simulation area preferably includes a rotatable drive wheel support member. As is illustrated in FIG. 3, in one presently preferred embodiment, the rotatable drive wheel support member can include a dynamometer 38, having an outer face 40 for rotatably engaging the drive wheel of the vehicle. Using the restraining assembly 32, the opposing balancing wheel, or typically the front wheel, is secured to the platform, such as on a front treadmill 42 for balancing the front wheel on a level approximately equal to that of the rear drive wheel, and the rear wheel is restrained in rotating engagement with the dynamometer. Each dynamometer can advantageously be provided with a braking mechanism such as brakes 43 for braking the dynamometer, and the braking mechanism is preferably under a master control of an operator of a control unit 56, to be described further hereinafter, for bringing each of the vehicles to a halt and stopping the competition.

Referring to FIG. 4, in another presently preferred embodiment, the rotatable drive wheel support member can include a drive wheel treadmill 44, having an outer face 46 for rotatably engaging the drive wheel of the vehicle. Using the restraining assembly 32, the opposing balancing wheel, or typically the front wheel, can be secured to the platform, such as on a front treadmill 48 for balancing the front wheel on a level approximately equal to that of the rear drive wheel, and the rear wheel is restrained in rotating engagement with the treadmill. Each drive wheel treadmill can advantageously be provided with a braking mechanism such as brakes 49 for braking the treadmill, and the braking mechanism is preferably under a master control of an operator of the control unit 56, described further below, for bringing the vehicles to a halt and stopping the competition.

With reference to FIG. 5, in another presently preferred embodiment, the rear wheel is restrained in rotating engagement with a first or drive wheel treadmill 44, having an outer face 46 for rotatably engaging the drive wheel. The front wheel is restrained in rotating engagement with a second treadmill 50 that is preferably linked to the first treadmill by a chain drive 52, to provide for a realistic simulation of riding the motorcycles on a roadway. The dual, linked treadmills can advantageously be provided with a braking mechanism such as brakes 53 for braking the drive wheel treadmill and the front wheel treadmill, for bringing the vehicles to a halt and stopping the competition.

Referring again to the general overview of the drag racing simulation system as shown in FIG. 1, the drag racing simulation system preferably further includes a monitor unit 54 for monitoring the progress of the simulated drag racing, and a control unit 56 for controlling the brakes, the monitor and the operation of the drag racing simulation in general. A chair 57 is also typically provided for an operator near the control unit. In a presently preferred aspect of the invention, at least one sensor 58, illustrated in FIGS. 3, 4 and 5, is connected to the rotatable drive wheel support member for measuring the rotational velocity of the drive wheel and/or the acceleration of the drive wheel. The data generated by the sensor is received by the monitor, and the monitor typically includes a timing mechanism and a microprocessor based system, such as a computer, for determining and displaying such information as the speed, horsepower, revolutions per minute, and forward progress of the vehicles. The monitor also preferably includes one or more displays for displaying information about the drag racing simulation, such as one or more video monitors 60 that may be set up around the drag racing platform for displaying the horsepower, revolutions per minute, simulated speed, and simulated forward progress of the vehicles. In one aspect, the monitor includes a digital display or readout 62 for the numerical information; although this information could also be provided in the form of simulated analog meters or dials; and the monitor also preferably includes a series of lights 64 positioned in front of the vehicles for displaying forward progress of the vehicles by advancing sequences of energized lights.

The control unit 56 also preferably includes means for controlling the brakes, such as a brake pedal or switch (not shown) for an operator of the control unit, such as by electrically activated brakes connected to each of the brakes for controlling the operation of the brakes, although such brakes could also be controlled and activated hydraulically, for example.

In another presently preferred aspect of the drag racing simulation system, best illustrated in FIGS. 1 and 2, the racing platform includes a burnout area 70 at a rear portion of the racing platform, so that the drivers of the vehicles can prepare their drive wheel tires for the drag racing competition in an exhibition burnout period. The burnout area preferably includes one or more flaps 72 capable of being raised to prevent forward progress of the vehicles during the burnout period, and in a presently preferred embodiment, the flap can be raised such that the flap is generally perpendicular to the racing platform, with each flap for restraining one of each of the vehicles during a burnout period. Following the burnout period, the burnout flaps are lowered, so that the vehicles can then advance to the drag racing simulation areas.

In another presently preferred aspect of the drag racing simulation system, also shown in FIGS. 1 and 2, the racing platform includes one or more air blowers 74 at a front portion of the racing platform for blowing air past the vehicles to cool the vehicles. Smoke generators 75, such as smoke pots, for example, may also be provided on the racing platform near the blowers. In addition, the drag racing simulation system may include one or more lifts 76 adjacent to or mounted to the perimeter of the racing platform to facilitate entry and exit of the vehicles, although the lifts can be replaced or supplemented by ramps 78 or a similar suitable means.

In a second presently preferred embodiment, the stationary drag racing simulation system of the invention provides for another approach to a "virtual" form of a drag race, which in every way duplicates the actual event without exposing the racers to any of the safety issues, without requiring an actual drag strip. In this second preferred embodiment, a pair of stationary dynamometers (also referred to as "dynos") are used. Each of the stationary dynamometers consists of a rotating drum, upon which the rear tire of the motorcycle is placed, and a large electric motor which operates as a braking mechanism. The vehicles are firmly secured, so that no part of the vehicles can move except the rear tires, which turn the dynamometer drums. During an actual drag race, the vehicle and rider are subjected to a variety of loads. The engine produces torque, which is applied to the pavement as a tractive force, and the forces of aerodynamic drag, friction and inertia oppose this force. The aerodynamic drag force depends on the frontal area of the vehicle and the drag coefficient of the vehicle, and varies as the square of the vehicle velocity. The friction force is basically constant at speeds lower than 150 mph. The inertia force is equal to the mass of the vehicle and rider times the vehicle acceleration, and thus varies as a function of vehicle acceleration. The stationary drag racing simulation system of the invention simulates the interaction of these forces.

Figure 6:
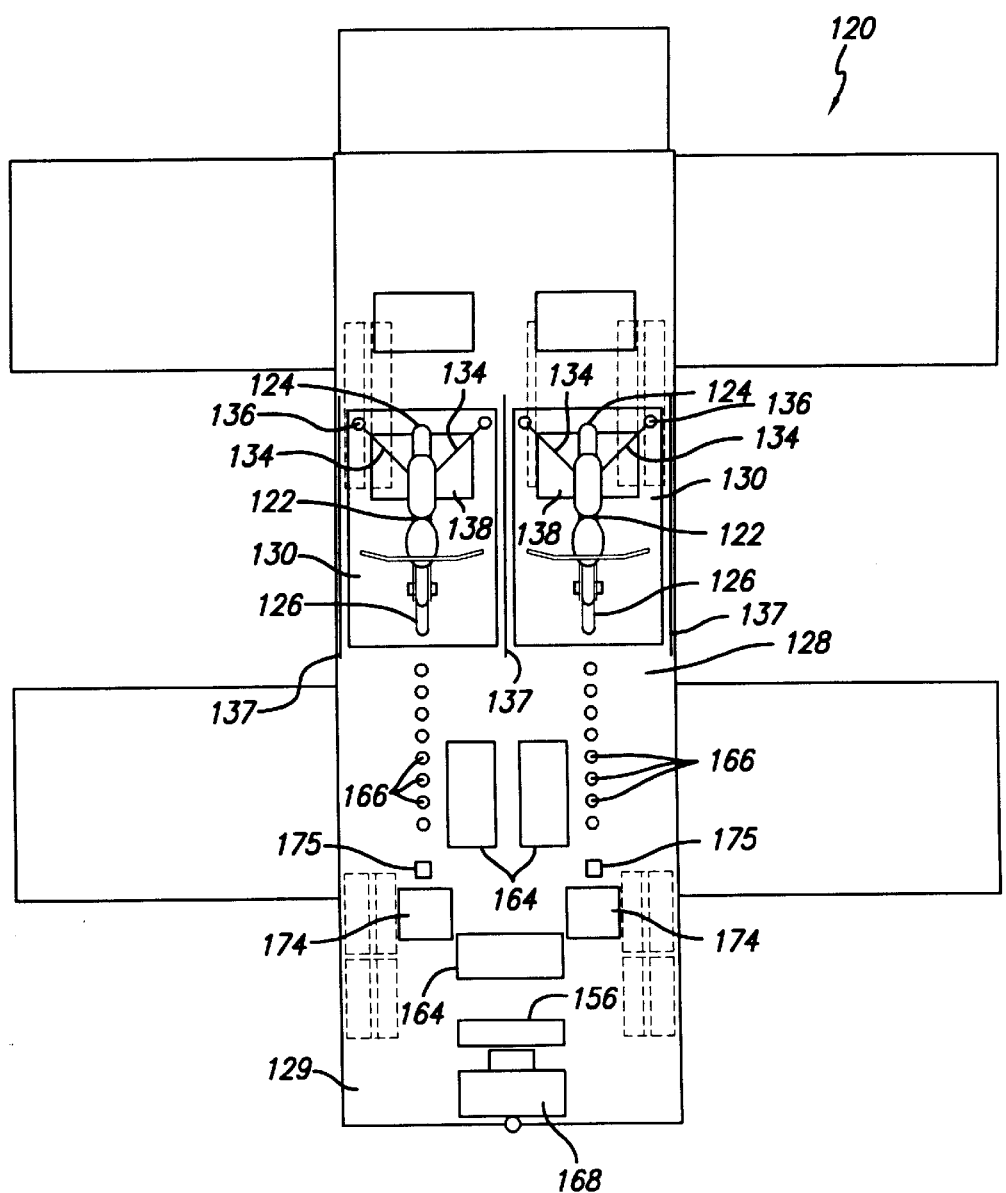
FIG. 6 is a schematic diagram showing a general overview of a second embodiment of the drag racing simulation system of the invention.
Figure 7:
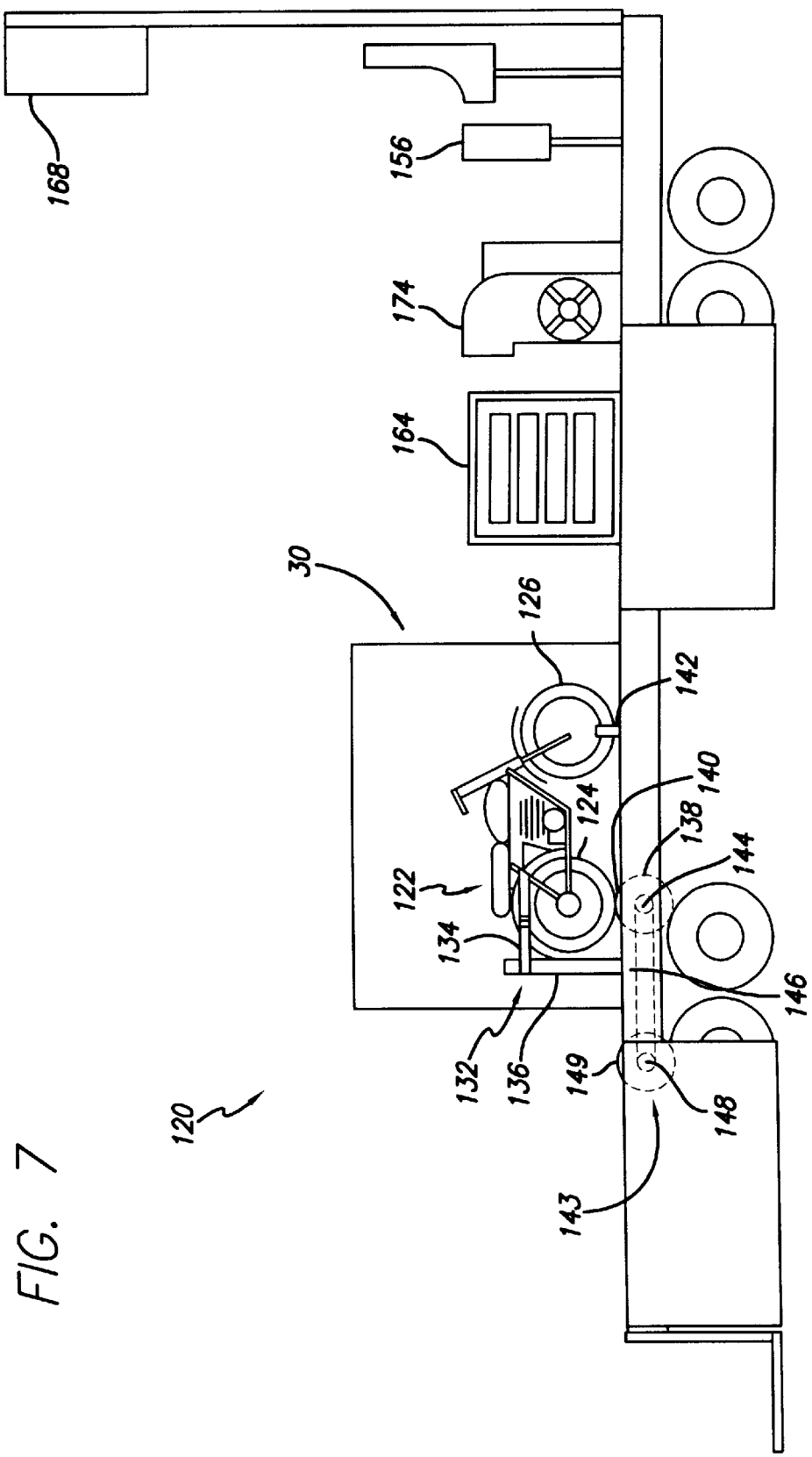
FIG. 7 is a side elevation view of the drag racing simulation system of FIG. 6.

With reference to FIGS. 6–10, in the second presently preferred embodiment, the invention is accordingly embodied in a drag racing simulation system 120, shown generally in FIGS. 6 and 7, for a vehicle such as a motorcycle 122, having a drive wheel 124 and typically having an opposing wheel, such as a front wheel 126 in rear wheel drive vehicles, for simulating drag racing while the motorcycle remains stationary, although the drag racing simulation system is equally applicable for use with vehicles in which non-drive wheels may be removed such as for securing the vehicles, and with other motorized vehicles such as cars and trucks, as well as non-motorized vehicles such as bicycles and the like having a drive wheel and an opposing wheel balancing the vehicle, such as a front wheel, although the system of the invention would be equally applicable to front wheel drive vehicles. The drag racing simulation system preferably includes a racing platform 128 upon which the vehicles can engage in simulated competition drag racing, and which is preferably viewable by spectators. In another presently preferred aspect, the racing platform is also transportable, so that it could for example, be moved into a stadium, or so that bleachers could be readily brought nearby. In one presently preferred aspect, the racing platform may be placed on a flatbed 129 of a truck. The racing platform could also be placed on a trailer, or made similar to a mobile home, so that the racing platform could be towed to a performance location and stationed appropriately for competition and viewing.

Figure 8:
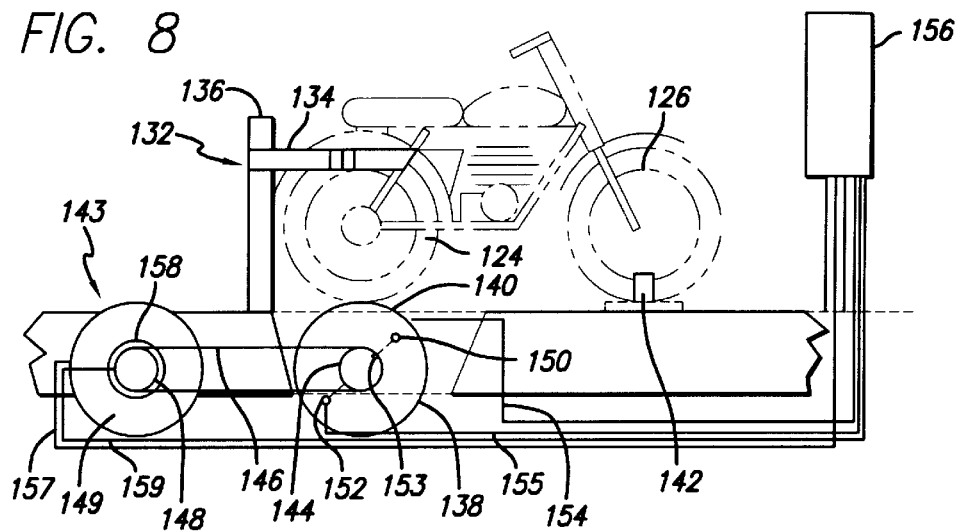
FIG. 8 is a cutaway view of a portion of the drag racing platform of the drag racing simulation system of FIG. 6 showing the eddy current braking device and rotatable drive wheel support member.

The racing platform preferably includes a plurality of drag racing simulation areas 130 for accommodating one or more competing vehicles, with each drag racing simulation area having a restraining assembly 132 best seen in FIG. 8 for firmly securing the vehicle to the platform in a generally upright position within the drag racing simulation area. In one presently preferred aspect, illustrated in FIGS. 6, 7 and 8, the restraining assembly includes a plurality of non-elastic mounting straps 134, such as nylon straps, for example, that can be cinched tightly to the vehicle and are in turn secured to posts 136 mounted on the platform to prevent the vehicles from being driven off the platform or falling over, and to prevent injury to the riders. Alternatively, the vehicles could be restrained by other non-elastic securing devices, such as clamps, for example, or the like. Plexiglass panels 137 may also be installed on the drag racing platform between the drag racing simulation areas, as described above.

As is illustrated in FIG. 8, in one presently preferred embodiment, each drag racing simulation area preferably includes a rotatable drive wheel support member 138, such as a dynamometer drum or roller. The rotatable drive wheel support member has an outer face 140 for rotatably engaging the drive wheel of the vehicle, and against which the drive wheel can be tightly secured by the non-elastic mounting straps. The roller has typically is a steel drum having a ½ inch wall and 9 inch radius, designed to have a large amount of rotating inertia, and can only apply load during acceleration. The inertia of the roller and its radius determine the linear equivalent mass of system, which has been measured at 518.2 pound mass. This means that spinning the roller requires the same force as accelerating a motorcycle of this mass. Of course, this value is typically much lower than the combined mass of the motorcycle and rider, but the extra load is produced by the eddy current module, and these two components work together to apply the correct amount of load to the vehicle. As is explained further below, the rotational position of the roller is determined by a position sensor located outside of the main shaft bearing. This sensor not only determines position, which is necessary to calculate where the rider is on the track, but is also used to calculate velocity and acceleration (which are used in the calculation of load).

The opposing balancing wheel, such as the front wheel, is currently preferably non-rotatably secured to the platform by a securing device 142, such as by a non-elastic strap secured to the platform, although the securing device may be any similar suitable device, such as a clamp secured to the platform, for example. When the motorcycle is placed on the dynamometer drum or roller, the front wheel is rolled into the front wheel securing device, and the motorcycle is moved until the rear wheel is located directly over the center of the roller. Then, the rear of the motorcycle is secured using two belts which are connected to its frame and to the dynamometer drum or roller securing stanchions. Belt tension should be large enough to virtually reduce any lateral movement of the motorcycle. Each rotatable drive wheel support member is advantageously provided with a braking mechanism 143 for providing braking torque to the rotatable drive wheel support member, for realistically and accurately simulating the effects of vehicle and the vehicle operator inertia, as well as aerodynamic forces and frictional forces on the vehicle and the vehicle operator.

The rotatable drive wheel support member includes a gear sprocket 144, and as part of the braking mechanism is engaged by a chain drive 146 to a gear sprocket 148 of the braking mechanism, which is currently preferably an eddy current braking device 149, such as a "JACOBS DRIVELINE BRAKE" eddy current module available from Jacobs Vehicle Systems, allowing the accurate and nearly instantaneous application of a braking torque simulating drag racing conditions, and allowing the monitoring of elapsed time, reaction time, and operation of the vehicles. The eddy current module is actually a large electric motor which applies load to the motorcycle. It is located at the rear of the dynamometer frame and is attached to the roller using a toothed belt. This module is secured using two bearings which allow it to rotate. Rotation of the module does not occur because a load-measuring device, also referred to as a load cell, is connected on one side, thus restricting movement while measuring the amount of load applied. Although this module is capable of producing 500 ft-lb. of torque, it is software limited to 200 ft-lb. of torque, which requires 20 amps of current when connected to a 120 VAC source.

In one presently preferred embodiment, the rotatable drive wheel support member is provided with a first rotational sensor 150 and a second rotational sensor 152 offset approximately 190° from the first rotational sensor. The rotatable drive support members for each contestant can be set, for example, at the position of the first rotational sensor at the start of the racing competition, and the angular offset of the two rotational sensors thereby allows measurement of the elapsed time for rotation of the drive wheel support member from the first rotational sensor to the second rotational sensor for determining an initial reaction time of the contestants at the commencement of the race. The known circumference of the rotatable drive wheel support member, typically 5 feet for example, allows the determination of a linear speed, acceleration and position of the contestants, by counting the signals generated by either or both of the rotational sensors, which can be optical sensors, such as opposing LED devices 153 and photodetectors 150, 152, for example.

The signal outputs 154, 155 from the rotational sensors are input to a control unit 156, which is also connected via line 157 to the braking mechanism for controlling the braking torque applied to the rotatable drive wheel support member and drive wheel of the vehicles. The control unit currently preferably comprises a computer adapted for receiving inputs from the rotational sensors and signals 159 representing actual measured brake torque from brake torque sensor 158 connected to the braking mechanism, and allowing entry and storage of data in a database concerning known characteristics of the competing vehicles, including but not limited to mass of the vehicles and operators for determining inertia for example, aerodynamic drag characteristics and friction drag characteristics of the vehicles and/or for individual parts of the vehicles such as tires, cowlings and windscreens, for example, and the like. The control computer is the heart of the dynamometer assembly. Not only does it allow the system operator to enter all racer information to be stored in a database, but it also controls the eddy current modules, the displays, the light strips and fans. This computer is typically located between the dynamometers, but allows the operator to be seated to one side of the entire assembly where a monitor, mouse, and keyboard are located. Although highly ruggedized, the control computer is a sensitive device which is not designed to weather the elements, so that it must be removed and re-installed prior to travel.

Figure 9:
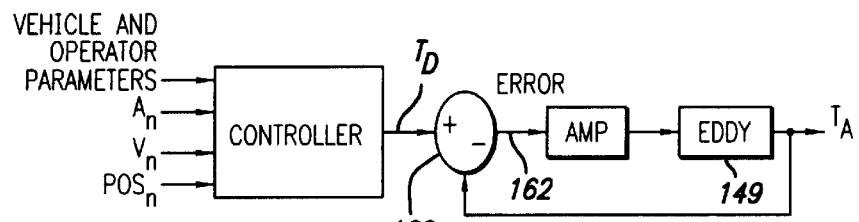
FIG. 9 is a schematic diagram of the braking torque control system for the drag racing simulation system of FIG. 6.

The control unit currently preferably includes an embedded controller such as that available from Delta Tau Data Systems of Northridge, Calif., for feedback control of the braking torque applied by the braking mechanism, based upon inputs to the control unit of acceleration (Ac), velocity (V), simulated linear position (P), as is illustrated in FIG. 9. The embedded controller is a dedicated controller designed specifically to control electric motors such as the eddy current modules. The control unit generates a command signal for desired torque ($T_D$) that is communicated to the braking mechanism to cause the braking mechanism to apply torque to the rotatable drive wheel support member and drive wheel of the vehicles. The torque sensor generates a signal representing the actual braking torque ($T_A$) provided, which is received at the summing junction 160 along with the command signal for desired torque ($T_D$) for comparison with the desired torque, and to determine a torque error 162 for modification of the desired braking torque current (Amp) provided to the braking mechanism. For example, the actual braking torque value can be subtracted from the desired braking torque value at the summing junction to determine the supply flow error, which can then be added to the desired braking torque signal to provide an adjusted braking torque signal ($T_{Adj}$) communicated to the braking mechanism.

Figure 10:
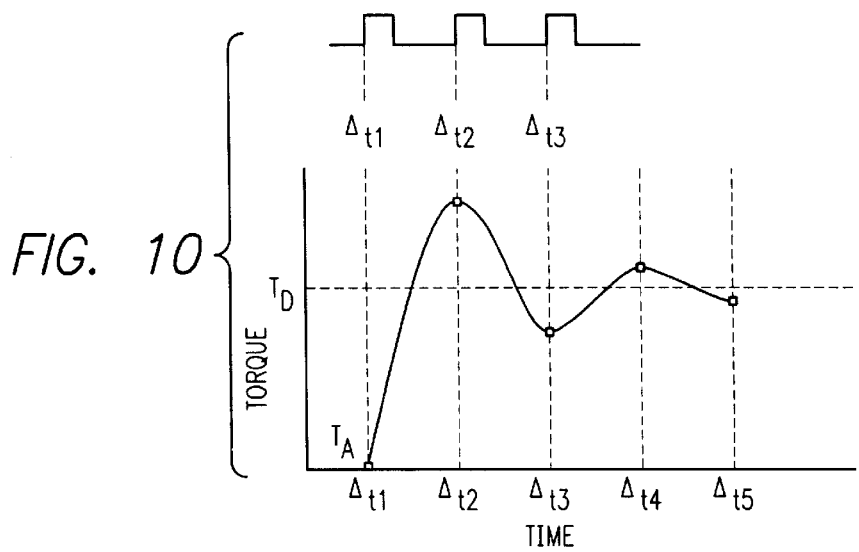
FIG. 10 is a graphical representation of the braking torque over time as applied by the eddy current braking device with the control system for the drag racing simulation system of FIG. 6.

As is illustrated in FIG. 10, the velocity, acceleration and position or forward progress of the vehicles, which can be determined by the control unit from pulses from the rotational sensors, can be used by the control unit to determine the desired torque ($T_D$), and the braking torque feedback can be used to quickly and accurately adjust the braking torque applied to the rotatable drive wheel support member and drive wheel of the vehicles. A display or monitor unit 164 connected to the control unit is also provided for displaying information such as the velocity, acceleration and position of the vehicles concerning the simulated progress of the drag racing competition, and the operation of the drag racing simulation in general. This information could also be provided in the form of simulated analog meters or dials, and a series of lights 166 are also preferably positioned in front of the vehicles for displaying forward progress of the vehicles by advancing sequences of energized lights. The contestants and spectators can use the light strips as a visual aid in determining who is winning the race. There are typically 24 lights which illuminate during the race. The number of lights per foot of racetrack depends on which track length is selected (⅛ mile, ¼ mile, and ½ mile). The light strips use 12 VDC lights and are connected to a 12 VDC power supply, as well as the main control computer. The display also includes a race tree 168 which is a National Hot Rod Association (NHRA) competition tree containing the proper lights for two race lanes, and which is controlled by the main computer. The upper amber lights are used for staging, while the lower three amber lights, one green light, and one red light are used for racing. The tree must be connected to a 120 VAC source, but is controlled by 12 VDC signals from the computer.

In another presently preferred aspect of the drag racing simulation system, also shown in FIGS. 6 and 7, the racing platform includes one or more fans or air blowers 174 at a front portion of the racing platform for blowing air past the vehicles to cool the vehicles. The fans are used to cool the motorcycle's engine during the race, and to give the racers a sense of "wind velocity." The fans must be connected to a 120 VAC source, and currently must be activated manually, but future plans include the automation of these devices. Smoke generators 175, such as smoke pots, for example, may also be provided on the racing platform near the blowers.

In terms of drag racing, the following examples will serve to illustrate the understanding of the operation of the stationary vehicle drag racing system of the invention and the simulation of a race by utilization of the applied forces. Assuming that there are two identical motorcycles in terms of weight, frontal area, drag coefficient, and friction, considering two motorcycles to be identical means: 1) there should be identical elapsed times in the drag race, assuming each vehicle was shifted the same; 2) if the rider of one vehicle was heavier than the other, the lighter rider would have a lower time because his inertia force would be smaller; 3) if the riders both weighed the same but one sat "head high" while the other sat in the "tucked position," the head high rider would have a higher time because his drag coefficient would be higher, meaning a larger aerodynamic drag force; and 4) the friction force, which is a function of tire pressure and vehicle/rider weight, will vary little between most motorcycles of the same type. In other words, having more power than your opponent does not necessarily guarantee you a win in a drag race, so that it is important to take inertia, aerodynamic drag, and friction, as well as the skill of the riders into account in order to determine the winner of the drag race.

In order to completely duplicate the loads that the rider and vehicle experience in a real race, the drag racing simulation system must be provided with the motorcycle and rider weights, the frontal area of the motorcycles, their drag coefficient, and their friction factors. The motorcycle and rider can easily be weighed, and the rest of the data is available in current literature. This information is fed into a computer which controls the drag racing simulation system. As the race takes place, the necessary loads are determined by the system over one hundred times a second, thus allowing for very accurate control. The control computer also controls the entire event, calculating the position, velocity, acceleration, and time during the race and makes this data available to the participants at the end of the race. The stationary drag racing system of the invention thus permits the simulation of a real race without the attendant safety risks of a real race.

In one example of a hypothetical racing scenario, two motorcycles of the same brand can be provided for racing, one with a fairing and saddlebags, and one without, and with the riders weighing different amounts as well. In race number one, both riders launch the same, and the lighter rider with the clean vehicle wins hands down. However, the other rider claims he would win if he/she weighed less. Instead of making him lose the weight, his weight is simply changed in software and a re-run occurs. Again, the same rider loses, only to claim it's the saddlebags that are causing extra aerodynamic drag. Of course, he could take off the bags, but this would be time consuming and the same effect can be accomplished by simply changing the frontal area and drag coefficient of his bike in software. Another race occurs, and he loses again. Frustrated, he leaves but decides to install a high performance exhaust system, guaranteed by the manufacturer to increase performance. The riders both return later and use the last recorded values (lighter rider, no bags) and race again. However, close examination of the data reveals that the high performance exhaust system made his motorcycle produce less power, but the reason he won was attributed to his improved reaction time.

The software package utilized with the stationary vehicle drag racing simulation system of the invention was written in Visual Basic, in order to take fall advantage of its database access capabilities and its graphical user interface. In order to perform a drag race, much information is needed. First, all data about the racer and his/her motorcycle must be entered into the database. This database contains all the information about the rider, the motorcycle, and the race results. When a racer decides to enter the competition, the racer must fill out the racer entry form which contains all necessary information about the contestant, and the motorcycle. Then, the operator must enter the information into the database by the use of the address form illustrated in FIG. 11. After executing the software, a windows style interface appears on the screen, with a series of "buttons" which execute a series of tasks. The first task, prior to any racing, is the entry of the racer information into the database. The leftmost button on the toolbar is the address button, and a single click will launch the address form. Here, the operator will record all information the racer provides except the racer identification number (racerid). The racerid is a unique number assigned to each participant in a sequential order. The first person to enter the database will be assigned racerid #1. Racerid #0 is reserved for single lane racing (this option is discussed in more detail later). After the data is entered, the form is printed out and given to the contestant.

Assuming that all contestants have been entered into the database, racing can now commence. The address form is closed and the "dyno" form is now selected, which is illustrated in FIG. 12. As the form begins to load, communication is established with all peripheral devices such as the secondary control computer, the displays, and the lights. Any problems will be reported at this point. When the form loads, racing can now begin. The motorcycles are placed on the respective dynamometer rollers and are strapped down. As this is taking place, the address printout for each racer is given to the operator. The operator selects "NEW RACE" which assigns a distinct race identification number, which is different from the racer identification numbers. Each race must have a unique number, and can have one or two racers. However, the race number is assigned by the computer prior to each race while the operator and the racers decide which lane to place the racer in. Regardless, the operator simply has to enter the racerid numbers in their respective boxes on the form, followed by execution of the "update" feature. Update means to update the database, and a search is performed. The result is the placement of the racer name and the racer's motorcycle type onto the race form. This helps the operator ensure that no "trickery" has occurred.

If all is well at this point, the race may now proceed. The racer names and their motorcycle types will appear on the LED displays. The operator then checks to make sure everything is secure, and selects the "stage" button. The displays show "STAGE" and the top amber lights illuminate on the race tree. The contestants should now slowly rotate their rear tires until the second amber light is illuminated. Please note that this is very difficult and for this reason, a pair of white lines can be painted on the rollers. It is sometimes easier to look down at the lines, and line them up instead of waiting for the lights to change. Regardless of the technique used, the rear tire must be located properly to ensure correct launching, or a "red light" may occur. The operator may have to spin the rear wheel backward, by hand to ensure proper alignment.

One staging is complete, the operator selects the race button and the tree lights begin to cycle: first, the three amber lights, then the green light. The racer must anticipate the green light in order to reduce reaction time, but if the launch occurs too quickly, the red light illuminates thus disqualifying the racer. Even if this does occur, the racer may still complete the race. The racer accelerates down the track (the motorcycle doesn't move yet the engines revs up and the rear time spins) and the light strips increment until the top two staging lights illuminate meaning race complete. The race data appears on the displays and the racers slowly apply their rear brakes until the rollers come to a complete stop. Then, the rider turns off the motorcycle and removes it from the stationary vehicle drag racing simulation assembly.

The data may be printed for the participants using the "print" button. At this point, everything may be reset using the "reset" button and the process can be repeated.

The stationary vehicle drag racing simulation assembly also offers a number of options. At any point, a "late" contestant can be entered into the racer database by simply selecting the "address" button. When this is complete, racing can once again commence. If a racer desires to race alone, his Racerid number is entered into the proper lane and a "0" is entered into the open lane. At any time, the operator can look at the entire sequence of race events by entering the view menu and selecting "race." This is particularly useful in solving disputes between racers or simply looking at old data.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A drag racing simulation system for a vehicle having a drive wheel, for simulating drag racing while the vehicle remains stationary, the system comprising:

a rotatable drive wheel support member having an outer face for rotatably engaging the drive wheel of the vehicle;

a braking assembly operatively engaged with said rotatable drive wheel support member for applying a braking torque to said rotatable drive wheel support member and the drive wheel of the vehicle to simulate inertial, aerodynamic and frictional forces of drag racing the vehicle;

at least one sensor provided on the rotatable drive support member for monitoring a simulated forward progress of the simulated drag racing;

a control unit for determining a desired braking torque to be applied to said rotatable drive wheel support member and the drive wheel of the vehicle to simulate inertial, aerodynamic and frictional forces of drag racing the vehicle based upon input from said at least one sensor for monitoring the simulated forward progress, and for generating a desired braking torque signal to control application of braking torque by said braking assembly; and a sensor for measuring an actual braking torque applied to said rotatable drive wheel support member and the drive wheel of the vehicle, means for comparing the actual braking torque with the desired braking torque signal to determine a braking torque error, and means for modifying the desired braking torque signal based upon said braking torque error.

2. The drag racing simulation system of claim 1, wherein said control unit comprises a computer for controlling the application of braking torque to said rotatable drive wheel support member and the drive wheel of the vehicle to simulate inertial, aerodynamic and frictional forces of drag racing the vehicle based upon inputs from said at least one sensor for monitoring the simulated forward progress and from said means for modifying the desired braking torque signal based upon said braking torque error.

3. The drag racing simulation system of claim 1, further comprising a racing platform having a drag racing simulation area, and a restraining assembly for securing the vehicle to said platform in a generally upright position.

4. The drag racing simulation system of claim 3, wherein said racing platform has a plurality of drag racing simulation areas for simultaneous simulation of drag racing of a plurality of vehicles.

5. The drag racing simulation system of claim 3, wherein said restraining assembly comprises a plurality of non-elastic straps securing the vehicle to the platform.

6. The drag racing simulation system of claim 5, wherein said racing platform comprises a plurality of posts disposed on said drag racing simulation area, and said non-elastic straps are secured to said posts.

7. The drag racing simulation system of claim 3, wherein said racing platform comprises a flatbed of a truck.

8. The drag racing simulation system of claim 1, wherein said at least one sensor provided on the rotatable drive support member comprises a position sensor connected outside a main shaft bearing for measuring the rotation velocity and acceleration of the drive wheel.

9. The drag racing simulation system of claim 1, wherein said vehicle is operated by a contestant, and wherein said at least one sensor comprises a first rotational sensor and a second rotational sensor operatively engaged with said rotatable drive wheel support member, said second rotational sensor being offset a predetermined rotational angle from the first rotational sensor for determining a reaction time of the contestant.

10. The drag racing simulation system of claim 1, further comprising at least one monitor for displaying at least one of a reaction time, elapsed time, horsepower, revolutions per minute, simulated speed, simulated acceleration, and simulated forward progress of the vehicle.

11. The drag racing simulation system of claim 10, further comprising a series of lights positioned in front of the vehicle for displaying the simulated forward progress of the vehicle.

12. A method for providing simulated drag racing for a plurality of vehicles while the vehicles remain stationary, each of the vehicles having a drive wheel, the steps of the method comprising:

providing a rotatable drive wheel support member having an outer face for each of the vehicles;

rotatably engaging the drive wheels of each of the vehicles to the outer face of the rotatable drive wheel support members;

monitoring a simulated forward progress of the simulated drag racing by at least one sensor provided for each of the rotatable drive support members;

applying a braking torque to said rotatable drive wheel support members and the drive wheels of each of the vehicles to simulate inertial, aerodynamic and frictional forces of drag racing the vehicles;

wherein said step of applying a braking torque comprises determining a desired braking torque to be applied to each said rotatable drive wheel support member and the drive wheel of the vehicle to simulate inertial, aerodynamic and frictional forces of drag racing the vehicle based upon input from said at least one sensor, and for generating a desired braking torque signal for controlling the application of braking torque to each of said rotatable drive wheel support members and the respective drive wheels of the vehicles to simulate inertial, aerodynamic and frictional forces of drag racing the vehicles; and measuring an actual braking torque applied to each said rotatable drive wheel support member and the respective drive wheels of the vehicles, comparing the actual braking torque with the desired braking torque signal to determine a braking torque error for each of the vehicles, and modifying the desired braking torque signal based upon said braking torque error.

13. The method of claim 12, wherein said step of monitoring the simulated forward progress of the simulated drag racing by at least one sensor comprises providing a position sensor connected outside a main shaft bearing for measuring the rotational velocity and acceleration of each of said rotatable drive wheel support members.

14. The method of claim 12, wherein said plurality of vehicles are operated by a corresponding plurality of contestants, respectively, and further comprising the step of providing a first rotational sensor and a second rotational sensor operatively engaged with said rotatable drive wheel support member, said second rotational sensor being offset a predetermined rotational angle from the first rotational sensor for determining a reaction time for each of the contestants.

15. The drag racing simulation system of claim 12, wherein each of said plurality of vehicles is operated by a contestant, and further comprising the step of displaying at least one of a contestant's reaction time, elapsed time, horsepower, revolutions per minute, simulated speed, simulated acceleration, and simulated forward progress for each of the vehicles.

* * * * *